United States Patent
Choi et al.

(10) Patent No.: US 9,740,327 B2
(45) Date of Patent: *Aug. 22, 2017

(54) DISPLAY DEVICE WITH INTEGRATED TOUCH SCREEN

(71) Applicant: LG Display Co., Ltd., Seoul (KR)

(72) Inventors: Yoon Jong Choi, Gyeongsangbuk-do (KR); Keuk Sang Kwon, Gyeongsangbuk-do (KR); Seung Chul Park, Gyeongsangbuk-do (KR); Nam Kyun Cho, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,124

(22) Filed: Sep. 11, 2015

(65) Prior Publication Data

US 2015/0378509 A1 Dec. 31, 2015

Related U.S. Application Data

(63) Continuation of application No. 14/584,008, filed on Dec. 29, 2014.

(30) Foreign Application Priority Data

Jun. 30, 2014 (KR) .................. 10-2014-0080754

(51) Int. Cl.
*G06F 3/041* (2006.01)
*G06F 1/32* (2006.01)
*G06F 3/044* (2006.01)

(52) U.S. Cl.
CPC .......... *G06F 3/0416* (2013.01); *G06F 1/3262* (2013.01); *G06F 3/041* (2013.01); *G06F 3/0412* (2013.01); *G06F 3/044* (2013.01)

(58) Field of Classification Search
CPC ...... G06F 3/0416; G06F 1/3262; G06F 3/041; G06F 3/0412
USPC ........................................... 345/173
See application file for complete search history.

(56) References Cited

U.S. PATENT DOCUMENTS

| | | | |
|---|---|---|---|
| 8,411,117 B2 | 4/2013 | Fujioka et al. | |
| 8,792,062 B2 | 7/2014 | Hwang et al. | |
| 8,884,917 B2 | 11/2014 | Seo | |
| 8,970,535 B2 | 3/2015 | Saitoh et al. | |

(Continued)

OTHER PUBLICATIONS

Office Action for U.S. Appl. No. 14/584,008, Feb. 12, 2016, 12 Pages.

(Continued)

*Primary Examiner* — Towfiq Elahi
(74) *Attorney, Agent, or Firm* — Fenwick & West LLP (57) ABSTRACT

A display device with integrated touch screen is provided. The display device includes a panel configured to include a plurality of electrodes and to be division-driven in a display driving mode and a touch driving mode during one frame period, a display driver IC configured to apply a common voltage to the plurality of electrodes during the display driving mode, and an ROIC configured to apply, to the plurality of electrodes, a touch scan signal for sensing a touch when the touch driving mode is a first touch driving mode, and apply, to the plurality of electrodes, a touch scan signal for detecting a touch input position when the touch driving mode is a second touch driving mode.

24 Claims, 4 Drawing Sheets

(56) References Cited

U.S. PATENT DOCUMENTS

| | | |
|---|---|---|
| 8,988,626 B2 | 3/2015 | Lee |
| 9,170,691 B2 | 10/2015 | Yang et al. |
| 9,251,758 B2 | 2/2016 | Teranishi et al. |
| 9,372,583 B2 | 6/2016 | Kim et al. |
| 9,513,731 B2 | 12/2016 | Ding et al. |
| 9,542,030 B2 | 1/2017 | Kim et al. |
| 2004/0227743 A1 | 11/2004 | Brown |
| 2011/0061947 A1* | 3/2011 | Krah .............. G06F 1/3215 178/18.01 |
| 2012/0056835 A1 | 3/2012 | Choo et al. |
| 2012/0169660 A1 | 7/2012 | Seo |
| 2012/0218482 A1 | 8/2012 | Hwang et al. |
| 2013/0176251 A1 | 7/2013 | Wyatt et al. |
| 2013/0241868 A1 | 9/2013 | Kim et al. |
| 2013/0265276 A1* | 10/2013 | Obeidat .............. G06F 3/044 345/174 |
| 2014/0028577 A1* | 1/2014 | Krah .............. G06F 3/0416 345/173 |
| 2014/0049486 A1 | 2/2014 | Kim et al. |
| 2014/0125626 A1* | 5/2014 | Yang .............. G02F 1/134336 345/174 |
| 2014/0132534 A1 | 5/2014 | Kim |
| 2014/0160067 A1 | 6/2014 | Kim et al. |
| 2014/0176459 A1 | 6/2014 | Pyo |
| 2014/0191989 A1 | 7/2014 | Saitoh et al. |
| 2014/0292711 A1 | 10/2014 | Teranishi et al. |
| 2015/0002462 A1 | 1/2015 | Zhao et al. |
| 2016/0041438 A1 | 2/2016 | Hu et al. |
| 2016/0132140 A1 | 5/2016 | Ding et al. |
| 2016/0216833 A1 | 7/2016 | Butler et al. |

OTHER PUBLICATIONS

Office Action for U.S. Appl. No. 14/584,008, dated Aug. 9, 2016, 25 pages.
Office Action for U.S. Appl. No. 14/584,008, dated Dec. 2, 2016, 30 pages.
Office Action for U.S. Appl. No. 14/584,008, dated Apr. 21, 2017, 34 pages.

* cited by examiner

FIG. 1
Related Art

| | |
|---|---|
| Touch Active | #1 #2 #3 #4 #5 #6 #1 #2 #3 #4 #5 #6 |
| Touch Ilde | #1 #2 #3 #4 #5 #6 |
| ROIC OPERATION | ROIC On |

DISPLAY DEVICE WITH INTEGRATED TOUCH SCREEN

CROSS-REFERENCE TO RELATED APPLICATIONS

This application is a continuation application under 35 U.S.C. §120 of U.S. patent application Ser. No. 14/584,008 filed on Dec. 29, 2014, which claims the benefit of Korean Patent Application No. 10-2014-0080754 filed on Jun. 30, 2014, both of which are hereby incorporated by reference as if fully set forth herein.

BACKGROUND OF THE INVENTION

Field of the Invention

The present invention relates to a display device, and more particularly, to a display device with integrated touch screen.

Discussion of the Related Art

With the advancement of information-oriented society, various requirements for display field are increasing. Recently, various display devices, such as liquid crystal display (LCD) devices, plasma display panels (PDPs), organic light emitting display devices, etc., are being used. Such display devices use a touch-based input method which enables a user to easily, intuitively, conveniently input information or a command, instead of a general input method using a button, a keyboard, or a mouse.

In order to provide the touch-based input method, it is required to determine the presence of a user's touch and accurately detect touch coordinates.

To this end, in the related art, a touch sensing function is provided by using one of various touch types such as a resistive type, a capacitance type, an electromagnetic induction type, an infrared type, and an ultrasound type. In the capacitance type, a mutual capacitance type that uses a mutual capacitance between a plurality of touch electrodes (for example, longitudinal electrodes and horizontal electrodes) provided in a touch screen panel or a self-capacitance type that detects the presence of a touch and touch coordinates based on a capacitance change between pointers such as a touch electrode and a finger is widely used.

In various touch types, a touch driving mode may be divided into an idle mode for determining whether there is a touch input and an active touch mode for detecting a touch input position. That is, a panel is driven in the idle mode for determining whether the panel is touched, and when a touch input occurs while the idle mode is being executed, the panel is driven in the active touch mode for detecting a touch input position.

However, in general touch screens, there is no driving difference between the idle mode and the active mode in a touch type, and for this reason, power is unnecessarily consumed because a touch operation of a panel is performed even in the idle mode identically to the active touch mode.

Hereinafter, the above-described problem will be described with reference to FIGS. 1 and 2.

Figure 1:
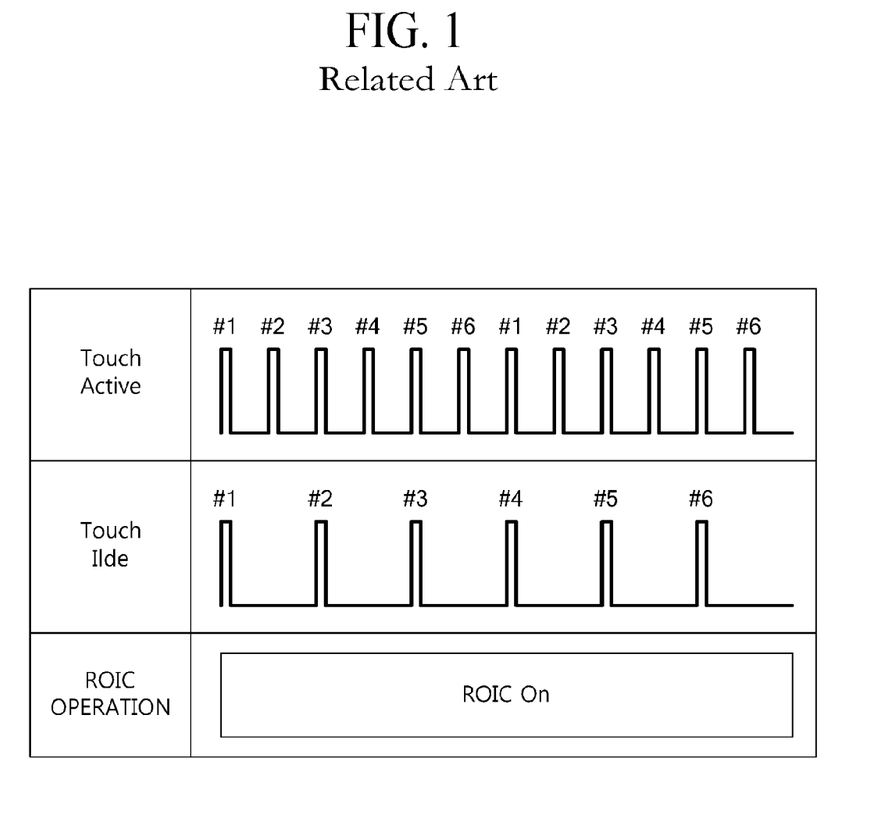
FIG. 1 is a diagram illustrating an application of a touch scan signal in an idle mode and an active mode in a general touch screen display device

FIG. 1 is a diagram illustrating an application of a touch scan signal in an idle mode and an active mode in a general touch screen display device.

In the general touch screen display device, as illustrated in FIG. 1, the touch scan signal is continuously applied through an ROIC in a touch active driving mode and a touch idle driving mode.

To provide a more detailed description on driving of FIG. 1, electrodes #1 to #6 may be sensed a total of two times in the touch active driving mode. In other words, in an example of FIG. 1, the touch scan signal is applied to all electrodes a total of two times in the touch active driving mode during one frame period. In the touch idle driving mode, the electrodes #1 to #6 may be sensed once. In other words, in the example of FIG. 1, the touch scan signal is applied to all the electrodes once in the touch idle driving mode during one frame period.

As described above, unlike the touch active driving mode, in the touch idle driving mode, a method is used in which the number of times the panel is wholly sensed is reduced by lowering a frequency at which the touch scan signal is applied, and the ROIC is always turned on even in the touch idle driving mode. For this reason, even when the touch idle mode is continuously executed, consumption power is not reduced.

Figure 2:
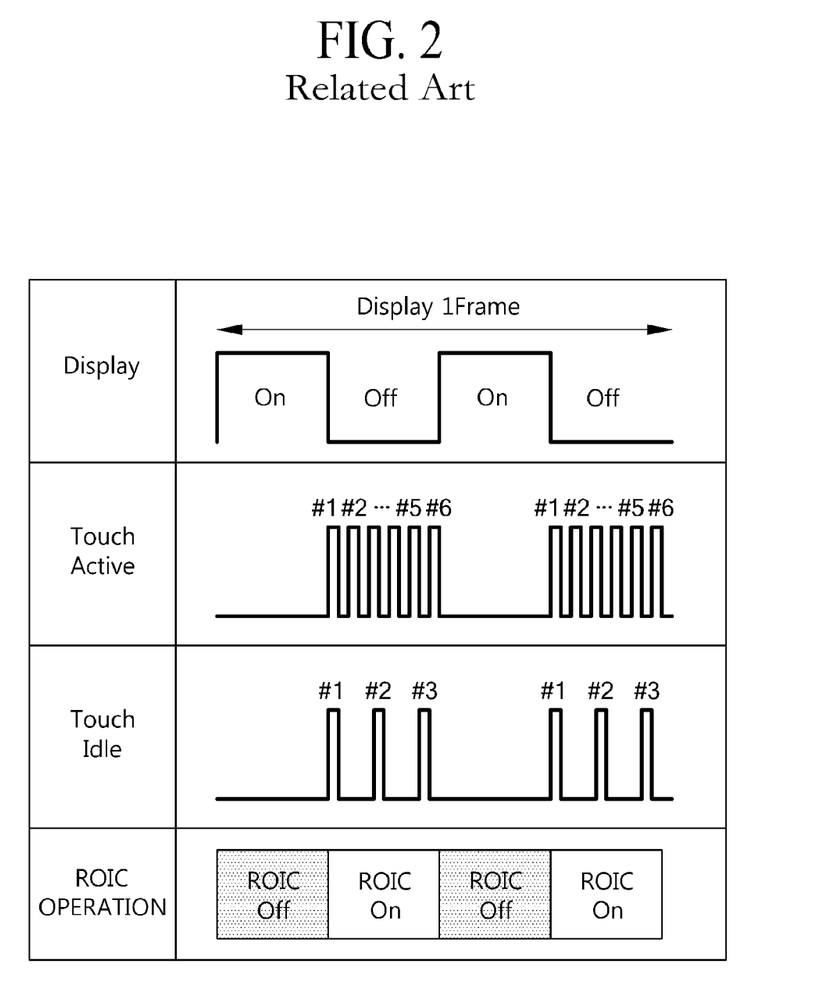
FIG. 2 is a diagram illustrating an application of a touch scan signal in an idle mode and an active mode in a general display device with integrated touch screen.

FIG. 2 is a diagram illustrating an application of a touch scan signal in an idle mode and an active mode in a general display device with integrated touch screen.

The display device with integrated touch screen includes an in-cell type touch screen, and a display driving operation and a touch driving operation are time-division performed during one frame. For such driving, a common electrode which is used for display driving is used as a touch electrode in a touch driving period.

Referring to FIG. 2, in the general display device with integrated touch screen, a touch scan signal is continuously applied through ROIC in a touch driving mode including the touch active driving mode and the touch idle driving mode.

In other words, FIG. 2 illustrates an example of the general display device with integrated touch screen. As described above, a display driving operation and a touch driving operation are time-division performed during one frame, and thus, the touch scan signal is continuously applied through the ROIC in the touch driving mode except the display driving mode.

To provide a more detailed description on driving of FIG. 2, electrodes #1 to #6 may be sensed a total of two times in the touch active driving mode included in the touch driving mode. In other words, in an example of FIG. 2, the touch scan signal is applied to all electrodes a total of two times in the touch active driving mode during one frame period. In the touch idle driving mode, the electrodes #1 to #3 may be sensed a total of two times in the touch idle driving mode. Alternatively, in the touch idle driving mode, the electrodes #1 to #3 may be sensed once, and the electrodes #4 to #6 may be sensed once.

As described above, unlike the touch active driving mode, in the touch idle driving mode, a method is used in which the number of times the panel is wholly sensed is reduced by lowering a frequency at which the touch scan signal is applied, and the ROIC is always turned on even in the touch idle driving mode identically to the touch active driving mode. For this reason, in the touch driving mode of an in-cell type touch screen according to an example of FIG. 2, even when the touch idle mode is continuously executed, consumption power is not reduced.

SUMMARY OF THE INVENTION

Accordingly, the present invention is directed to provide a display device with integrated touch screen that substantially obviates one or more problems due to limitations and disadvantages of the related art.

An object of the present invention is to provide a display device with integrated touch screen, which can reduce consumption power in a touch idle driving mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a display device with integrated touch screen comprises a panel configured to include a plurality of electrodes, wherein the panel is division-driven in a display driving mode and a touch driving mode during one frame period; a display driver IC configured to apply a common voltage to the plurality of electrodes during the display driving mode; and an ROIC configured to apply, to the plurality of electrodes, a touch scan signal for sensing a touch when the touch driving mode is a first touch driving mode, and apply, to the plurality of electrodes, a touch scan signal for detecting a touch input position when the touch driving mode is a second touch driving mode, wherein number of times the touch scan signal is applied to the plurality of electrodes during one frame period when the touch driving mode is the first touch driving mode is smaller than number of times the touch scan signal is applied to the plurality of electrodes during one frame period when the touch driving mode is the second touch driving mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, some embodiments of the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present.

Figure 3:
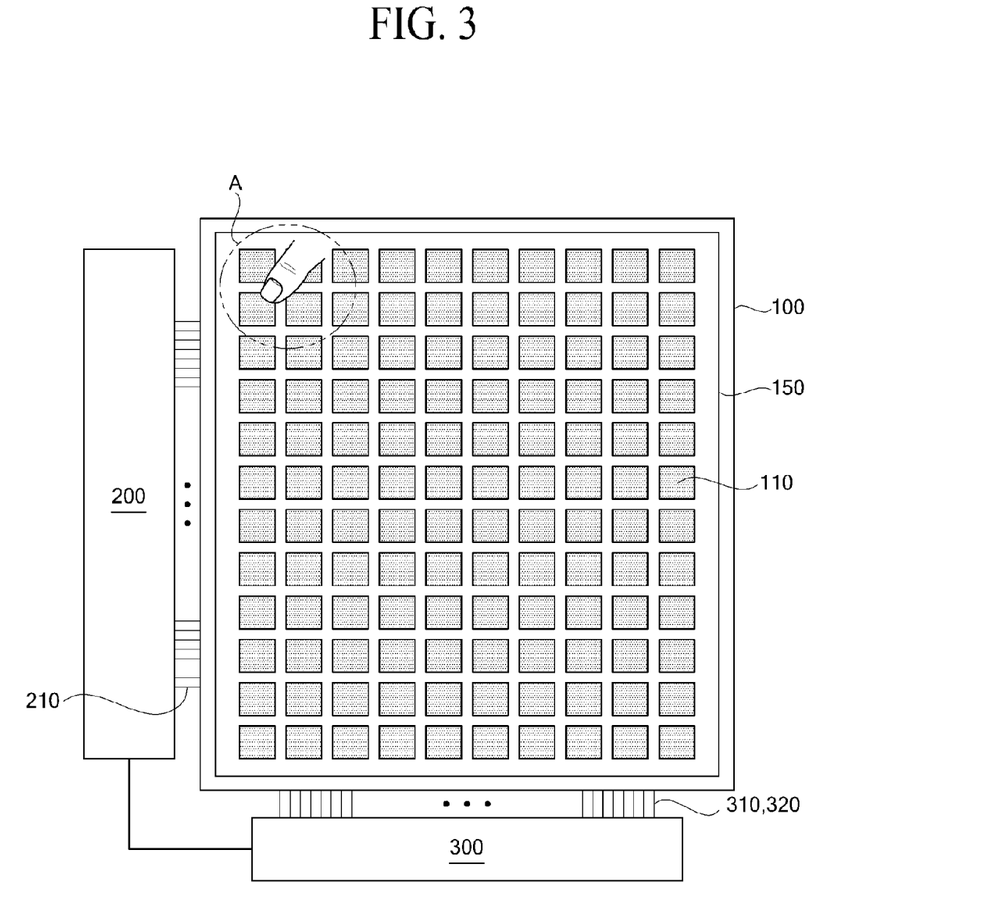
FIG. 3 is a diagram illustrating a configuration of a display device with integrated touch screen according to an embodiment of the present invention.

FIG. 3 is a diagram illustrating a configuration of a display device with integrated touch screen according to an embodiment of the present invention.

The display device with integrated touch screen according to an embodiment of the present invention includes a panel, which includes a thin film transistor (TFT) substrate and a color filter (C/F) substrate which are provided with a liquid crystal layer therebetween.

In the panel 100, a plurality of data lines 310 are arranged in a first direction (for example, a longitudinal direction of the panel 100), a plurality of gate lines 210 are arranged in a second direction (for example, a horizontal direction of the panel 100), and a plurality of pixels (not shown) are defined by intersections between the plurality of data lines 310 and the plurality of gate lines 210.

A transistor is provided in a pixel area of each of the plurality of pixels. Here, the transistor includes a source electrode or a drain electrode connected to a data line, a gate electrode connected to a gate line, and the source electrode or the drain electrode connected to a pixel electrode.

The panel 100 includes a plurality of electrodes 100. When a driving mode of the panel 100 is a touch driving mode, the electrodes 100 are driven as touch electrodes that sense a touch input of the panel 100 according to an applied touch scan signal, and when the driving mode of the panel 100 is a display driving mode, the electrodes 100 are driven as common electrodes that generate an electric field along with pixel electrodes provided in the panel 100 according to an applied common voltage. The plurality of electrodes 110 may be disposed on the TFT substrate of the panel 100, or may be disposed on the C/F substrate of the panel 100.

The panel 100 may be division-driven in the display driving mode and the touch driving mode during one frame period by using the plurality of electrodes that act as touch electrodes or common electrodes depending on the driving mode of the panel 100. The panel 100 may act as a display panel, or act as a touch screen panel (TSP).

That is, the panel 100 may be a panel in which the display panel and the touch screen panel are integrated as one body, or may be the display panel into which the touch screen panel is built in an in-cell type.

As illustrated in FIG. 3, the display device with integrated touch screen according to an embodiment of the present invention may further include a rear resistance layer 150 which is formed on the plurality of electrodes 110. Here, the rear resistance layer 150 may contact a top of the C/F substrate configuring the panel 100, and may be formed by using AS pol and Yl coating. In particular, the rear resistance layer 150 may be formed of a transparent material such as indium tin oxide (ITO). When a driving mode is the touch driving mode, the rear resistance layer 150 may receive a touch scan signal or a signal corresponding to the touch scan signal, thereby reducing a parasitic capacitance which is generated due to the plurality of electrodes.

The display device with integrated touch screen according to an embodiment of the present invention includes a display driver integrated circuit (IC). The display driver IC, as illustrated in FIG. 3, includes a gate driver 200, a data driver 300, and a common voltage generator. Here, the common voltage generator may be provided in the gate driver 200 and the data driver 300, or may be provided as a separate element outside or inside the panel 100.

When the driving mode of the panel 100 is the display driving mode, the display driver IC includes the gate driver 200 that sequentially supplies a scan signal to the plurality of gate lines, the data driver 300 that respectively supplies data voltages to the plurality of data lines, and the common voltage generator that applies a common voltage to the plurality of electrodes in the display driving mode.

Here, when the driving mode of the panel 100 is the display driving mode, the gate driver 200 sequentially applies the scan signal, used for display, to the plurality of gate lines 210.

That is, the gate driver 200 supplies a gate signal, which is the scan signal for display, to the gate lines, and thus, the data voltages are respectively applied to the pixels of the panel during a display period.

For example, the gate driver 200 supplies the gate signal to the gate lines to select the data lines of the panel 100 to which the data voltages are applied, and in response to the gate signal, the pixels of the panel 100 are charged with data voltages Vdata applied from the data driver during the display period.

When the driving mode of the panel 100 is the display driving mode, the data driver 300 applies the data voltages Vdata, used for display, to the plurality of data lines 310.

The data driver 300 converts RGB data, input from a timing controller (not shown), into data voltages and output the data voltages. The data voltages output from the data driver are respectively supplied to the data lines 310.

The data driver 300 shifts a source start pulse SSP from the timing controller (not shown) according to a source shift clock SSC to generate a sampling signal. The data driver 300 latches image data RGB, input according to the source shift clock SSC, according to the sampling signal and converts the image data into the data voltages. Then, the data driver 300 respectively supplies the data voltages to the data lines in units of a horizontal line in response to a source output enable signal SOE.

To this end, the data driver 300 may include a data sampling unit, a latch, a digital-to-analog converter (DAC), and an output buffer. The data driver 300 may include an ROIC.

The common voltage generator generates the common voltage, and applies the generated common voltage to all the electrodes of the panel 100 in the display driving mode. Liquid crystal is driven with an electric field which is generated between the common electrode and the pixel electrode by the applied common voltage.

For reference, the timing controller receives a timing signal, including a vertical sync signal Vsync, a horizontal sync signal Hsync, a data enable signal DE, and a main clock CLK which are input from a system (not shown), to generate control signals GCS and DCS for controlling operation timings of the gate driver 200 and the data driver 300, and realigns RGB data input from the system (not shown) to output the realigned RGB data to the data driver 300.

The display device with integrated touch screen according to an embodiment of the present invention includes the ROIC. The ROIC may be provided in the data driver 300, or the ROIC and the data driver may be provided in one chip. Alternatively, based on a size or a type of the panel 100, the ROIC may be provided in the gate driver, or may be provided outside the gate driver and the data driver.

When the driving mode of the panel 100 is the touch driving mode, the ROIC applies a touch scan signal to all or some of the plurality of electrodes 110. Here, the touch scan signal is referred to as a touch sensing signal, a touch sensing voltage, or a touch driving voltage.

For example, when the driving mode of the panel 100 is the touch driving mode, the ROIC applies the touch scan signal to the plurality of electrodes. Here, when the plurality of electrodes are grouped, the ROIC may apply the touch scan signal to all or some of a plurality of electrode groups.

The touch driving mode according to an embodiment of the present invention is divided into a touch idle driving mode and a touch active driving mode, namely, is divided into an idle driving mode for determining the presence of a touch input and an active driving mode for detecting a touch input position.

When the touch driving mode is the idle driving mode, the ROIC according to an embodiment of the present invention applies, to the plurality of electrodes, the touch scan signal for determined whether there is a touch input, and determines whether the panel 100 is touched. When the touch driving mode is the active driving mode, the ROIC applies, to the plurality of electrodes, the touch scan signal for detecting a touch input position, and detects a touch input position of the panel 100.

Particularly, in the ROIC, the number of times the touch scan signal is applied to all the electrodes during one frame period in the idle driving mode is smaller than the number of times the touch scan signal is applied to all the electrodes during one frame period in the active driving mode.

For example, in the idle driving mode, the touch scan signal is applied to all the electrodes once during one frame period, and in the active driving mode, the touch scan signal is applied to all the electrodes twice or more during one frame period.

Due to such driving, in the display device with integrated touch screen according to an embodiment of the present invention, the number of times the touch scan signal is applied in the idle driving mode is reduced, thereby reducing consumption power. Also, in the touch idle driving mode, a driving time is shortened, and a display driving time increases, thereby improving a quality of an image in display driving.

Moreover, the ROIC receives sensing data (for example, a capacitance, a change amount of a capacitance, a voltage, etc.) measured by the ROIC according to the touch scan signal applied to the plurality of electrodes 110 acting as touch electrodes, determines whether there is a touch, and detects touch coordinates. For such an operation, the ROIC may further include a touch controller (not shown).

In other words, the touch controller receives a feedback signal based on the touch scan signal for sensing a touch and a feedback signal (i.e., sensing data) based on the touch scan signal for detecting a touch input position from the plurality of electrodes, and determines whether the panel 100 is touched or detects a touch input position.

The panel 100 of the display device with integrated touch screen according to an embodiment of the present invention repeatedly executes the display driving mode and the touch driving mode, and a timing of each of the display driving mode and the touch driving mode may be controlled according to a control signal output from the timing controller or the touch controller. Depending on the case, the timing of each of the display driving mode and the touch driving mode may be controlled by an interoperation of the timing controller or the touch controller.

In applying the touch scan signal to all or some of the plurality of electrodes 110, the ROIC may apply the touch scan signal through the data driver 300, or may apply the touch scan signal through the gate driver 200. In FIG. 3, it is illustrated that the touch scan signal is applied through the data driver, but the present invention is not limited thereto.

For reference, the common voltage which is generated for display driving by the common voltage generator is transferred to the plurality of electrodes through a signal line 320.

A direction, in which at least one signal line connected to each of the plurality of electrodes is provided, may be changed according to which of the data driver and the gate driver the touch scan signal and the common voltage are transferred through.

However, when the touch scan signal or the common voltage is transferred to the plurality of electrodes through the gate driver, a plurality of signal lines which connect the gate driver to the plurality of electrodes may be parallel to a direction in which the plurality of gate lines are provided.

As described above, the signal line 320 which allows the touch scan signal generated by the ROIC to be transferred to the plurality of electrodes through the data driver or the gate driver is provided.

In order to prevent an aperture ratio from being reduced, the signal line 320 may be provided in an area of the TFT substrate of the panel 100 corresponding to an area of a black matrix which is provided on the C/F substrate of the panel 100.

When the plurality of electrodes 110 are connected to the signal lines through two or more contact holes, a resistance between the plurality of electrodes and the signal line can be reduced.

In the above-described operation of the display device with integrated touch screen according to an embodiment of the present invention, an operation of the ROIC will be described in detail with reference to FIG. 4 again.

Figure 4:
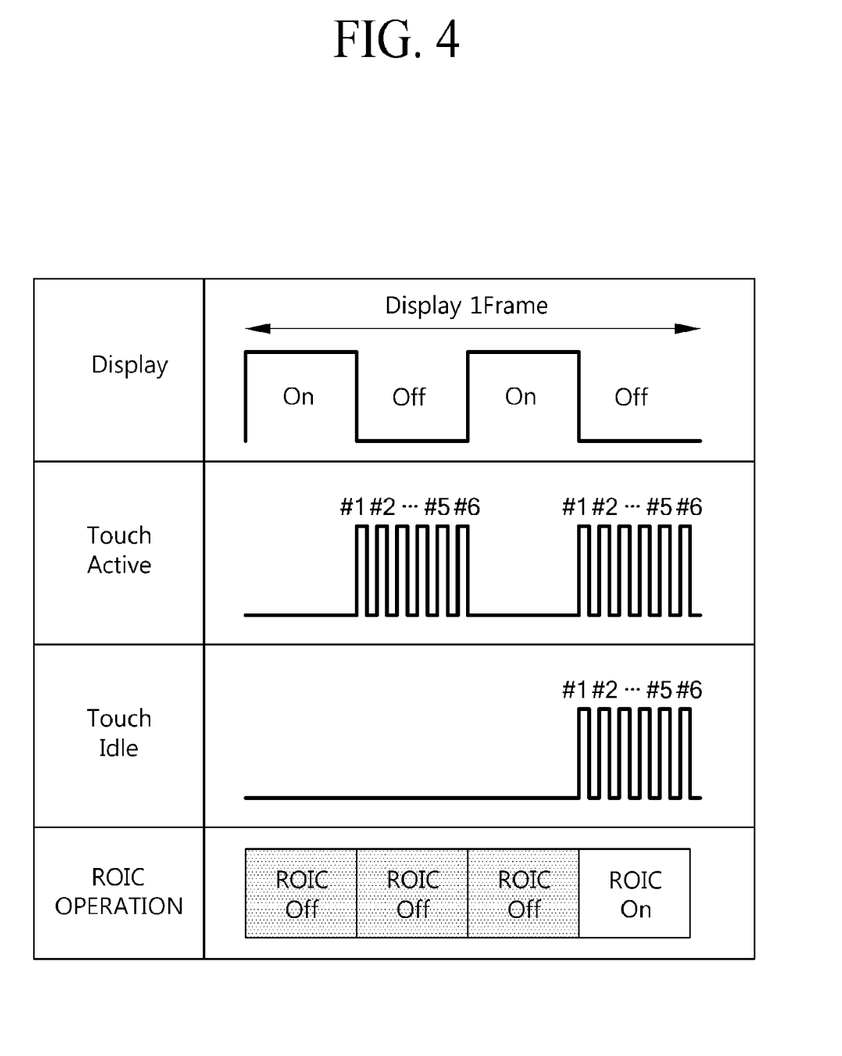
FIG. 4 is a diagram illustrating an application of a touch scan signal in an idle mode and an active mode in the display device with integrated touch screen according to an embodiment of the present invention.

FIG. 4 is a diagram illustrating an application of a touch scan signal in an idle mode and an active mode in the display device with integrated touch screen according to an embodiment of the present invention.

As illustrated in FIG. 4, in the touch active driving mode included in the touch driving mode, electrodes #1 to #6 are sensed a total of two times. In other words, in the touch active driving mode during one frame period, the touch scan signal is applied to all electrodes a total of two times. In the touch idle driving mode, the electrodes #1 to #6 are sensed once.

In the display device with integrated touch screen according to an embodiment of the present invention, the display driving mode and the touch driving mode may be alternately division-driven during one frame period.

Particularly, according to an embodiment of the present invention, the display driving mode and the touch active driving mode are alternately division-driven twice each. When the panel 100 is driven in the touch active driving mode during one frame, the ROIC maintains a turn-on state, and when the panel 100 is driven in the display driving mode, the ROIC maintains a turn-off state.

However, when the driving mode is the touch idle driving mode, the ROIC maintains a turn-on state during only a period where the touch scan signal is applied to all the plurality of electrodes in one frame period, and during the other period, the ROIC maintains a turn-off state. Such driving can be seen in the drawing (corresponding to the idle driving mode) illustrating an operation of the ROIC illustrated in FIG. 4. In other words, when the driving mode is the touch idle driving mode, although the display driving mode is turned off, the ROIC maintains a turn-off state.

Therefore, although the display driving mode is turned off, the ROIC does not unconditionally maintain a turn-on state. That is, the ROIC maintains a turn-on state during only period where the touch scan signal is applied to all the electrodes once during one frame period in the idle driving mode, and during the other period, the ROIC maintains a turn-off state, thereby reducing consumption power.

According to the example embodiments of the present invention, in the display device with integrated touch screen, the number of times the touch scan signal is applied in the touch active driving mode during one frame differs from the number of times the touch scan signal is applied in the touch idle driving mode during one frame, and thus, power consumption can be reduced in the touch idle mode. Further, a touch driving operation for sensing a touch is performed for a minimum of time in a touch idle driving mode included in a touch driving mode, and thus, power consumption can be reduced as compared to the related art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A driver circuit for a touch sensitive display device, the display device comprising a panel including a plurality of touch electrodes, data voltages being applied to pixels of the display device during a first display period and a second display period of a predetermined period and not being applied to the pixels of the display device during a first non-display period and a second non-display period of the predetermined period, the driver circuit comprising:
    circuitry to provide touch scan signals to the touch electrodes,
    wherein the circuitry is enabled to provide the touch scan signals to the touch electrodes for a first duration in both the first and the second non-display periods over the predetermined period in a first touch driving mode; and
    wherein the circuitry is enabled to provide the touch scan signals to the touch electrodes for a second duration in the first non-display period but not provide the touch scan signals during the second non-display period over the predetermined period in a second touch driving mode, the second duration being shorter than the first duration.

2. The driver circuit of claim 1, wherein a touch input is sensed during the second touch driving mode and a position of the touch input is determined during the first touch driving mode.

3. The driver circuit of claim 1, wherein a number of times the touch scan signal is applied to the touch electrodes over the predetermined period in the second touch driving mode is smaller than a number of times the touch scan signal is applied to the touch electrodes in the first touch driving mode.

4. The driver circuit of claim 3, wherein the predetermined period is one frame period of the touch sensitive display device, and the touch scan signal is applied to the touch electrodes twice over the one frame period in the first touch driving mode and once over the one frame period during the second touch driving mode.

5. The driver circuit of claim 1, wherein the driver circuit is further configured to apply a common voltage to the touch electrodes during the first and the second display periods of the touch sensitive display device, the first and the second display periods alternating with the first and the second non-display periods over the predetermined period.

6. The driver circuit of claim 5, wherein the driver circuit is turned off during the first and the second display periods.

7. The driver circuit of claim 5, wherein the driver circuit is turned on while the driver circuit applies the touch scan signals to the touch electrodes and is turned off while the driver circuit does not apply the touch scan signals to the touch electrodes.

8. The driver circuit of claim 1, wherein the driver circuit receives from the touch electrodes a feedback signal based on the touch scan signal and determines presence of a touch input on the touch electrodes or a position of the touch input based on the feedback signal.

9. A method of driving a touch sensitive display device, the touch sensitive display device comprising a panel including a plurality of touch electrodes and circuitry to provide touch scan signals to the touch electrodes, data voltages being applied to pixels of the display device during a first display period and a second display period of a predetermined period and not being applied to the pixels of the display device during a first non-display period and a second non-display period of the predetermined period, the method comprising:
providing the touch scan signals to the touch electrodes for a first duration in both the first and the second non-display periods over the predetermined period in a first touch driving mode; and
providing the touch scan signals to the touch electrodes for a second duration in the first non-display period but not provide the touch scan signals during the second non-display period over the predetermined period in a second touch driving mode, the second duration being shorter than the first duration.

10. The method of claim 9, wherein a touch input is sensed during the second touch driving mode and a position of the touch input is determined during the first touch driving mode.

11. The method of claim 9, wherein a number of times the touch scan signal is applied to the touch electrodes over the predetermined period in the second touch driving mode is smaller than a number of times the touch scan signal is applied to the touch electrodes in the first touch driving mode.

12. The method of claim 11, wherein the predetermined period is one frame period of the touch sensitive display device, and the touch scan signal is applied to the touch electrodes twice over the one frame period in the first touch driving mode and once over the one frame period during the second touch driving mode.

13. The method of claim 9, further comprising:
applying a common voltage to the touch electrodes during the first and the second display periods of the touch sensitive display device, the first and the second display periods alternating with the first and the second non-display periods over the predetermined period.

14. The method of claim 13, wherein the circuitry to provide the touch scan signals to the touch electrodes is turned off during the first and the second display periods.

15. The method of claim 13, wherein the circuitry to provide the touch scan signals to the touch electrodes is turned on while the touch scan signals are applied to the touch electrodes and is turned off while the touch scan signals are not applied to the touch electrodes.

16. The method of claim 9, further comprising:
receiving from the touch electrodes a feedback signal based on the touch scan signal; and
determining presence of a touch input on the touch electrodes or a position of the touch input based on the feedback signal.

17. A touch sensitive display device, comprising:
a panel including a plurality of touch electrodes, data voltages being applied to pixels of the display device during a first display period and a second display period of a predetermined period and not being applied to the pixels of the display device during a first non-display period and a second non-display period of the predetermined period; and
a driver circuit to provide touch scan signals to the touch electrodes,
wherein the driver circuit is enabled to provide the touch scan signals to the touch electrodes for a first duration in both the first and the second non-display periods over the predetermined period in a first touch driving mode; and
wherein the driver circuit is enabled to provide the touch scan signals to the touch electrodes for a second duration in the first non-display period but not provide the touch scan signals during the second non-display period over the predetermined period in a second touch driving mode, the second duration being shorter than the first duration.

18. The touch sensitive display device of claim 17, wherein a touch input is sensed during the second touch driving mode and a position of the touch input is determined during the first touch driving mode.

19. The touch sensitive display device of claim 17, wherein a number of times the touch scan signal is applied to the touch electrodes over the predetermined period in the second touch driving mode is smaller than a number of times the touch scan signal is applied to the touch electrodes in the first touch driving mode.

20. The touch sensitive display device of claim 19, wherein the predetermined period is one frame period of the touch sensitive display device, and the touch scan signal is applied to the touch electrodes twice over the one frame period in the first touch driving mode and once over the one frame period during the second touch driving mode.

21. The touch sensitive display device of claim 17, wherein the driver circuit is further configured to apply a common voltage to the touch electrodes during the first and the second display periods of the touch sensitive display device, the first and the second display periods alternating with the first and the second non-display periods over the predetermined period.

22. The touch sensitive display device of claim 21, wherein the driver circuit is turned off during the first and the second display periods.

23. The touch sensitive display device of claim 21, wherein the driver circuit is turned on while the driver circuit applies the touch scan signals to the touch electrodes and is turned off while the driver circuit does not apply the touch scan signals to the touch electrodes.

24. The touch sensitive display device of claim 17, wherein the driver circuit receives from the touch electrodes a feedback signal based on the touch scan signal and determines presence of a touch input on the touch electrodes or a position of the touch input based on the feedback signal.

\* \* \* \* \*